United States Patent [19]
Senft et al.

[11] 3,871,467
[45] Mar. 18, 1975

[54] INDEPENDENT WHEEL SUSPENSION FOR NON-STEERED WHEELS OF MOTOR VEHICLES

[75] Inventors: Ernst Senft, Moglingen; Manfred Von der Ohe, Stuttgart, both of Germany

[73] Assignee: Daimler-Benz Aktiengesellschaft, Stuttgart, Germany

[22] Filed: Apr. 23, 1973

[21] Appl. No.: 353,644

[30] Foreign Application Priority Data
Apr. 24, 1972 Germany............................ 2220034

[52] U.S. Cl............................. 180/73 C, 280/124 A
[51] Int. Cl............................................. B60g 3/18
[58] Field of Search.. 180/73 R, 73 C, 73 D, 73 TL, 180/73 TT; 280/124 A, 124 B; 267/20 A

[56] References Cited
UNITED STATES PATENTS

| | | | |
|---|---|---|---|
| 3,220,502 | 11/1965 | Muller............................. | 180/73 C |
| 3,257,121 | 6/1966 | Muller............................. | 267/20 A |
| 3,573,882 | 4/1971 | Van Winsen.................. | 280/124 A |
| 3,759,542 | 9/1973 | Loffler............................ | 280/124 A |

Primary Examiner—Philip Goodman
Assistant Examiner—John A. Carroll
Attorney, Agent, or Firm—Craig & Antonelli

[57] ABSTRACT

An independent rear wheel suspension for motor vehicles, especially for motor vehicles with a rear wheel drive, which includes a lower guide member and upper guide member and a wheel carrier guided as coupler by these guide members as well as a track link steering lever rigidly connected with the wheel carrier and disposed in a vehicle transverse plane as well as a track rod pivotally connected with the track link steering lever in a point of pivotal connection which is disposed in a plane approximately parallel to the plane of the guide member; the track rod with its point of pivotal connection at the track link steering lever is thereby located at least approximately at the same height as the point of pivotal connection of the guide member at the wheel carrier and is pivotally connected with its point of pivotal connection opposite the track link steering lever within the area of the axis of rotation of this guide member.

60 Claims, 7 Drawing Figures

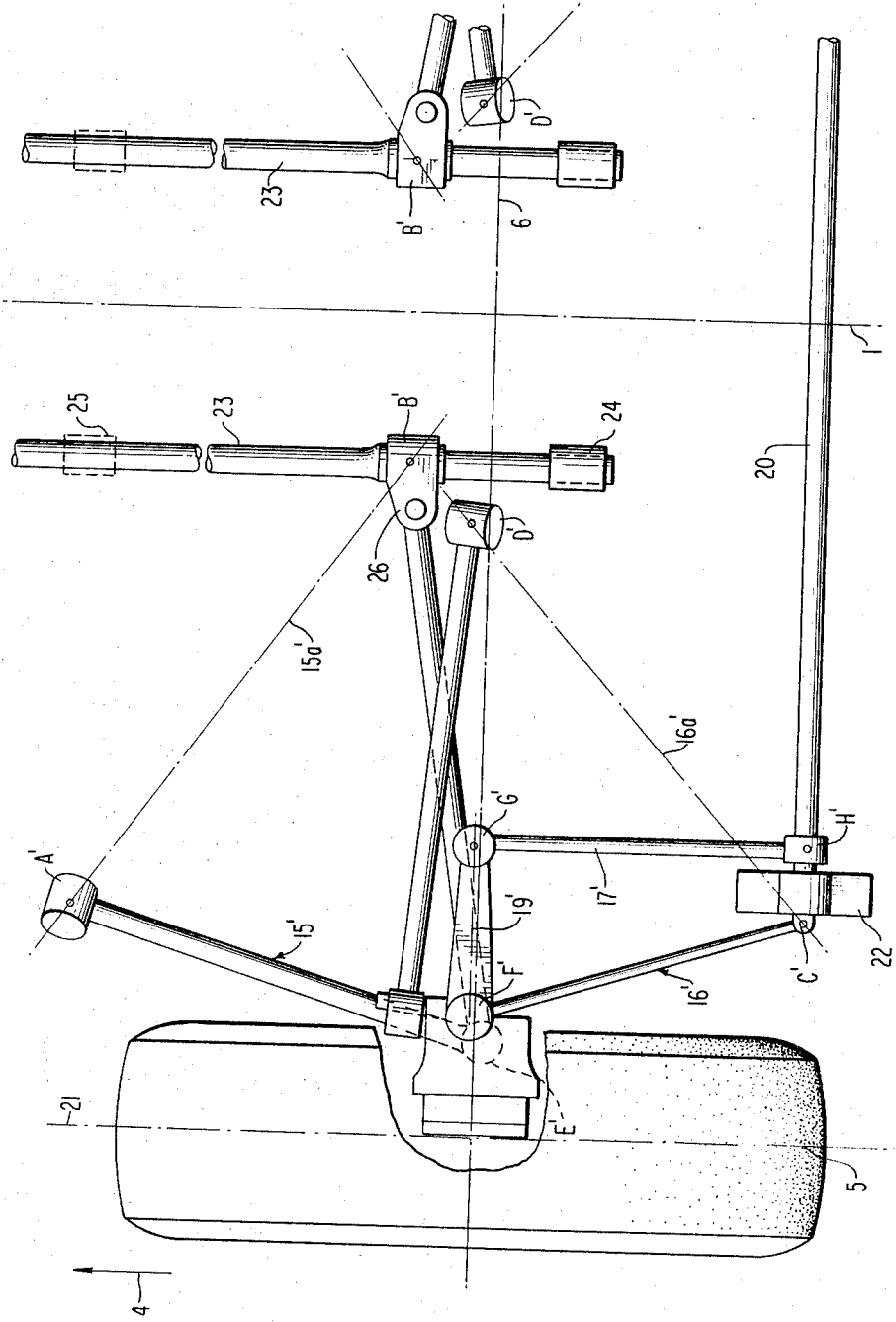

INDEPENDENT WHEEL SUSPENSION FOR NON-STEERED WHEELS OF MOTOR VEHICLES

The present invention relates to an independent rear wheel suspension for motor vehicles, especially for motor vehicles with rear axle drive, having a lower and an upper guide member and a wheel carrier guided as coupler by the guide members, a track link steering lever rigidly connected with the wheel carrier and disposed in a vehicle transverse plane and a track rod pivotally connected with the track link steering lever in a point of pivotal connection which extends in a plane approximately parallel to the plane of one of the guide members and in approximately the same direction as this guide member, as viewed in plan view.

With a prior art wheel suspension of the aforementioned type, the point of pivotal connection of the track link steering lever at the track rod, as regards its height location, is disposed within the area between the point of pivotal connection of the lower forward and the upper rear guide member at the wheel carrier, and additionally the track rod is disposed essentially in a plane parallel to the upper guide member having approximately the same direction of extension, though with a considerable shift in height. A guidance of the wheel in such a manner that the toe-in or toe-out, to be referred to hereinafter for brevity sake merely as "track," is kept constant, cannot be achieved with such an arrangement of the track link steering lever and track rod, and consequently with the known wheel suspension track changes, i.e., changes of the toe-in or toe-out cannot be avoided during the inward and outward spring deflections. However, such track changes become noticeable in a disagreeable manner especially at the driven wheels of motor vehicles having a rear axle drive, and by reason of the unstable driving condition, based on the principle of operation in rear axle drives, may lead already with relatively small deviations from the intended value to considerable impairments as regards the driving stability, the steering quietness, and finally also the driving safety.

The present invention is concerned with the task to avoid these disadvantages and to so construct a wheel suspension of the aforementioned type that the toe-in or toe-out of a wheel is practically constant over the entire spring range.

This is achieved according to the present invention in that the track rod, with its point of pivotal connection at the track link steering lever, is disposed at the wheel carrier at least at approximately the same height as the point of pivotal connection of the guide member extending approximately in the same direction, as viewed in side view, and is pivotally connected with its point of pivotal connection on the frame side, opposite the track link steering lever, within the area of the axis of rotation of this guide member. It is achieved by the location of the point of pivotal connection of the track rod at the track link steering lever according to the present invention that this point of pivotal connection with a constant track, which is understood to refer herein to toe-in or toe-out, describes over the entire spring range nearly exactly a spherical surface which has a defined location with respect to the spherical surface described by the point of pivotal connection of the corresponding guide member so that with a corresponding pivotal connection of the track rod on the frame side, which, according to the present invention, is located within the area of the axis of rotation of the corresponding guide member, the respectively selected wheel track can be accurately maintained. A directionally stable behavior of the vehicle can be assured thereby during driving the operation independently of the respective inward spring position of the wheels, which has an advantageous effect on the steering comfort, the driving comfort and the driving safety.

In the construction of the present invention, it is appropriate if the track rod and the upper guide member have approximately the same height location because a protected position for the track rod results in this manner. However, also an arrangement of the track rod at approximately the same height position as the lower guide member is possible within the scope of the present invention, which leads to particularly space-saving constructions and makes possible in particular also an elongated flat construction of the frame longitudinal bearer of the vehicle. It is appropriate according to a further development of the present invention if the point of pivotal connection between the track link steering lever and the track rod is located, as viewed in plan view, between the wheel plane and the point of pivotal connection of the corresponding guide member at the wheel carrier because not only the use of triangular guide members of simple construction as guide members is made possible thereby but also a favorable arrangement of the track rod is made possible without crank or offset thereof. If in reversal to this construction the point of pivotal connection between the track link steering lever and the track rod is provided within the scope of the present invention, as viewed in plan view, at a larger distance from the wheel plane than the point of pivotal connection of the corresponding guide member at the wheel carrier, then this leads to smaller forces in the track rod so that depending on the construction, the respectively prevailing constructional requirements can be taken into consideration.

In adaptation to the prevailing constructional conditions, it may be appropriate to use the solution according to the present invention in conjunction with wheel suspensions in which at least one of the guide members has an axis of rotation extending in the vehicle longitudinal direction or in which at least one of the guide members is provided with an axis of rotation disposed trasversely to the vehicle longitudinal direction. Furthermore, the solution of the present invention may also be provided in conjunction with wheel suspensions, in which at least one of the guide members has an axis of rotation extending obliquely to the vehicle longitudinal direction. The possibilities resulting therefrom as well as the solutions which are also within the scope of the present invention, to provide both of the guide members in one of the described arrangements, assure that in adaptation to the prevailing constructional requirements, the respectively most favorable wheel suspension can be selected and that with each of the selected suspensions the established track can be accurately maintained nonetheless over the entire spring range.

A particularly appropriate solution within the scope of the present invention resides in arranging the guide members with axes of rotation extending obliquely to the vehicle longitudinal direction and to so locate these inclined axes that, as viewed in plan view, they are inclined toward one another and extend inwardly toward one another. This proves advantageous both for the luggage space utilization, for example, as regards the arrangement of a spare wheel under the luggage space, properly speaking, as also as regards the seat arrangement in limousines. In conjunction with the fact that, as viewed in side view, the axis of rotation of the lower forward guide member rises toward the front and the axis of rotation of the upper rear guide member is preferably slightly inclined downwardly and that of the axes of rotation of the guide which are disposed crossing one another, the axis of rotation of the upper guide member extends obliquely downwardly, as viewed in rear view, the construction according to the present invention also leads to a solution which enables a brake and starting compensation.

In a constructive realization of the wheel carrier and of the accomodation of the track link steering lever at the wheel carrier, it is appropriate within the scope of the present invention to construct the track link steering lever in one piece with the wheel carrier in case of a cast wheel carrier. However, a separate mounting of the track link steering lever at the wheel carrier is also possible within the scope of the present invention.

In order to keep as small as possible the space requirement necessitated by the track rod, it is advantageous if the track rod extends approximately horizontally.

Within the scope of the solution according to the present invention in which for a double-guide-axle with a wheel carrier guided as coupler by the guide members, the track of the respective wheel is kept constant independently of the respective inward or outward spring position in that with a track rod extending in the vehicle longitudinal direction and with a track link steering lever extending transversely to the vehicle longitudinal direction, the point of pivotal connection of the track rod at the track link steering lever is located at approximately the same height as the point of pivotal connection of a guide member at the wheel carrier, it is possible with the use of a forwardly extending lower guide member, for the guide member to extend either forwardly or rearwardly with respect to the vehicle longitudinal direction so that the respective constructive requirements and the prevailing space conditions can be taken fully into consideration. With a view toward a favorable and uniform brake and starting equalization, an arrangement is thereby particularly appropriate in which the upper guide member extends rearwardly. The direction of extension of the track rod, again in relation to the vehicle longitudinal direction, corresponds according to the present invention approximately to the direction of extension of that guide member, whose point of pivotal connection at the wheel carrier lies approximately at the same height as the point of pivotal connection of the track rod at the track link steering lever.

In order not to jeopardize the track-constancy achieved by the guidance of the wheel carrier according to the present invention by undesirable movements of their own on the part of the guide member and of the track rod, it is appropriate to form the points of pivotal connection on the wheel-carrier side of the track rod and of the upper guide member, whose point of pivotal connection at the wheel carrier is located at approximately the same height as the point of pivotal connection of the track rod at the track link steering lever, as well as the point of pivotal connection on the frame-side of the track rod and of the outer point of pivotal connection on the frame-side of the upper guide member by bearing places constructed in a relatively hard manner. It is prevented thereby that different forces during braking and starting lead to track changes.

It has further proved as appropriate to constitute the points of pivotal connection of the upper guide member and of the track rod on the frame-side by bearing places provided at a structural part of the vehicle, especially provided at an auxiliary bearer, so that manufacturing inaccuracies during the manufacture cannot have a disadvantageous effect on the exact wheel guidance. If an auxiliary bearer is used, then it is of advantage to support the same relatively softly in the vehicle longitudinal direction in order to achieve a longitudinal springing which is appropriate for the roll-off or riding comfort. Since with such a construction in which the points of pivotal connection of the upper guide member and of the track rod on the frame side are mounted at the auxiliary bearer, the mentioned points of pivotal connection are displaced by the same amount during longitudinal spring movements of the bearer, the constancy of the track aimed-at by the present invention is not impaired.

A particularly economic and appropriate construction of the present invention resides in combining the axes of rotation of the upper and of the lower guide member so that upper and lower guide members can be constructed in one piece. The wheel carrier guided as coupler with respect to this one-piece guide member can be guided by way of at least one cylinder bearing support whose axis coincides with the straight line of connection of the points of pivotal connection, of which with an overhung bearing support of the wheel carrier at the guide member one of the points of pivotal connection is a theoretical point of pivotal connection.

Accordingly, it is an object of the present invention to provide a wheel suspension for the wheels of motor vehicles which avoids by simple means the aforementioned shortcomings and drawbacks encountered in the prior art.

Another object of the present invention resides in an independent wheel suspension for the wheels of motor vehicles which permits the track to be held constant over substantially the entire range of spring deflections of the wheels.

A further object of the present invention resides in a wheel suspension for the non-steered wheels of motor vehicles which improves the driving stability, the steering quietness and the driving safety.

Still another object of the present invention resides in a wheel suspension of the type described above in which the toe-in or toe-out of a wheel remains practically constant over the entire range of spring movements.

Another object of the present invention resides in a wheel suspension for the non-steered wheels of motor vehicles which makes it possible to maintain accurately constant the wheel track selected for the particular suspension.

A further object of the present invention resides in a wheel suspension for the non-steered wheel of motor vehicles in which the various parts are arranged in a compact and space-saving manner, enabling an economic manufacture and assembly of the various parts.

Still another object of the present invention resides in a wheel suspension of the type described above which permits a selection of the type of wheel suspension which is most favorable as regards the particular requirements made thereof in a given vehicle.

Another object of the present invention resides in a wheel suspension of the type described above which permits starting and brake nose-diving compensation by simple means.

These and further objects, features and advantages of the present invention will become more apparent from the following description when taken in connection with the accompanying drawing which shows, for purposes of illustration only, several embodiments in accordance with the present invention, and wherein:

FIG. 5 is a schematic plan view of a modified embodiment of a wheel suspension according to the present invention;

Figure 1:
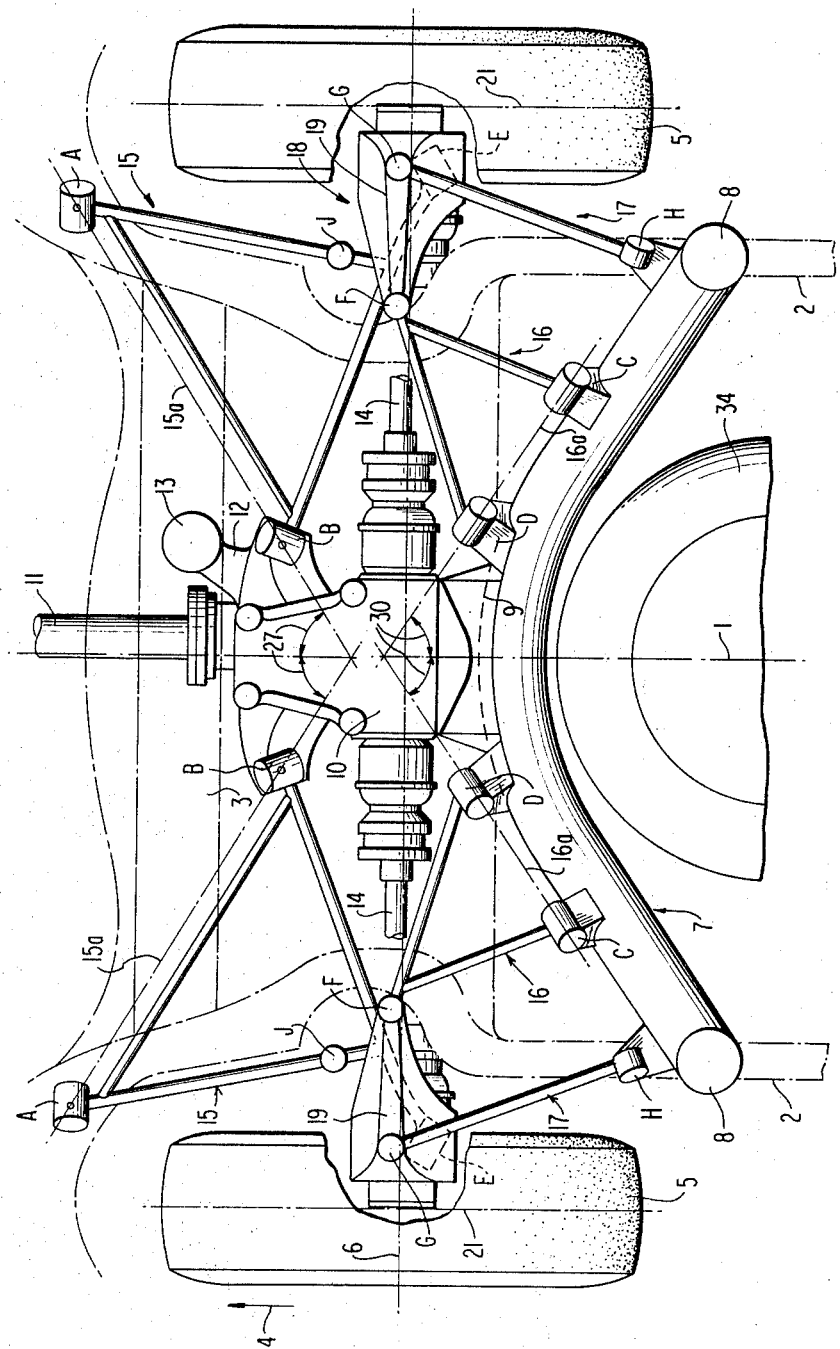
FIG. 1 is a schematic plan view of the floor group provided with frame-like reinforcements of a passenger motor vehicle within the area of the rear-driven axle thereof and equipped with wheel suspensions for the wheels of the vehicle according to the present invention.

Referring now to the drawing wherein like reference numerals are used, throughout the various views to designate like parts, and more particularly to FIG. 1, of the rear axle area of a vehicle, namely of a passenger motor vehicle, only the frame-like reinforcements of the floor group of the vehicle as well as the independent wheel suspensions for the driven wheels of the rear axle are shown schematically in plan view in this figure. The longitudinal bearers which extend in the longitudinal direction of the vehicle whose longitudinal axis is designated by reference numeral 1, are thereby designated in FIG. 1 by reference numerals 2; the longitudinal bearers 2 are connected with each other by a cross-bearer 3. In relation to the driving direction 4 (FIG. 1), the cross-bearer 3 is located in front of a vertical vehicle transverse plane 6 passing through the centers of the wheels 5. An auxiliary bearer generally designated by reference numeral 7 is mounted at the longitudinal bearers 2 according to the present invention opposite the cross-bearer 3 in relation to this transverse plane 6 which extends perpendicularly to the longitudinal axis 1 and is represented as a straight line 6, as viewed in plan view according to FIG. 1. The support of the auxiliary bearer 7 with respect to the longitudinal bearers 2 takes place by way of bearing supports 8 which are preferably so constructed that they permit a spring action in the vehicle longitudinal direction. The differential gear 10 is secured by way of a bracket 9 at the auxiliary bearer 7 within the central area thereof which is curved forwardly in relation to the driving direction 4. The Cardan shaft 11 is thereby connected with the input shaft of the differential gear 10. The differential gear 10 is additionally supported at the cross-bearer 3 by way of a support arm 12 and a bearing support 13. The bearing support 13 is preferably constructed like the bearing supports 8 in such a manner that it permits a spring action in the vehicle longitudinal direction. A three-point support results for the auxiliary bearer 7 by means of the bearing supports 8 and the bearing support 13.

The independent suspension for the non-steered rear wheels 5 adapted to be driven by way of the universal-joint shafts 14 takes place respectively by a lower guide member generally designated by reference numeral 15, by an upper guide member generally designated by reference numeral 16 and by a track rod generally designated by reference numeral 17 which is securely connected with the wheel carrier 18 by way of a track link steering arm 19. The pivotal connection of the track rod 17 at the track link steering lever 19 which extends parallel to the vehicle cross plane 6 as viewed in plan view, takes place in a point of pivotal connection G that may be constituted by a ball joint.

It can be seen from the plan view according to FIG. 1, that, with respect to the driving direction 4, the lower guide member 15 extends essentially forwardly from the wheel carrier 18 and the upper guide member 16 extends essentially rearwardly from the wheel carrier 18 and that furthermore the direction of extension of the track rod 17 corresponds essentially to that of the upper guide member 16. The axes of rotation 15a and 16a of the lower guide member 15 and of the upper guide member 16 are disposed at an angle to one another, as viewed in plan view, and extend toward one another in the direction to the vehicle center.

Both guide members 15 and 16 are constructed in the illustrated embodiment as triangular guide members. The guide member 15 has two points of pivotal connection A and B on the frame-side, of which the point of pivotal connection A is located within the area of the longitudinal bearer 2 and the point of pivotal connection B is located within the area of the differential gear 10. The lower guide member 15 is connected with the wheel carrier 18 in a point of pivotal connection E which is located near the wheel plane 21. The upper guide member 16 is supported at the auxiliary bearer 7 in two points of pivotal connection designated by reference characters C and D and is connected with the wheel carrier 18 in the point of pivotal connection F; the point of pivotal connection F which is located according to the present invention in the illustrated embodiment in a cross-plane together with the point of pivotal connection G, is located farther away from the wheel plane 21 than the point of pivotal connection E. The track rod 17 which in the illustrated embodiment is made in one piece with the wheel carrier 18, is connected with the wheel carrier 18 by way of the track link steering lever 19 in the point of pivotal connection G which, as illustrated in side view according to FIG. 2 and in rear view according to FIG. 3, is located approximately at the height of the point of pivotal connection F. The pivotal connection of the track-rod 17 on the frame-side takes place at the auxiliary bearer 7 in the point of pivotal connection H. The bearing places indicated by the points of pivotal connection are constituted for the points of pivotal connection A to D and H on the frame-side as well as for the point of pivotal connection E of the lower guide member 15 at the wheel-carrier side appropriately by bearing bushes whereas the points of pivotal connection F and G of the upper guide member 16 and of the track rod 17 are constructed as ball joints.

It is achieved by the described location of the track link steering lever 19 which is approximately parallel to the vehicle cross-plane 6 and by approximately the same height location of the point of pivotal connection F of the upper guide member 16 and of the point of pivotal connection G of the track rod 17 that the point of pivotal connection G moves nearly exactly on a spherical surface over the entire spring range so that a guidance of the wheel is attainable by way of the track rod 17 with which the selected wheel track remains preserved constant over the entire spring range. It is appropriate in this connection if, as in the illustrated embodiment, the point of pivotal connection H of the track rod 17 on the frame-side is located within the area of the axis of rotation 16a of the upper guide member 16. Furthermore, it is of advantage in connection therewith if the bearing bushes forming the points of pivotal connection C, D and H on the frame-side for the upper guide member 16 and the track rod 17 are constructed hard so that no track changes occur due to differing forces during braking and starting since the point of pivotal connection on the frame-side of the upper guide member 16 and of the track rod 17 are not movable with respect to each other as regards their location. The longitudinal spring action significant for the driving comfort is assured thereby in that the points of pivotal connection C, D and H, as illustrated in the embodiment, are provided at a structural part of the vehicle, in the given embodiment at the auxiliary bearer 7, which is yieldingly supported in the longitudinal direction of the vehicle by way of the bearing supports 8 and 13 which are constructed, for example, as rubber bearings. In contrast to the hard construction of the bearing bushes forming the points of pivotal connection C, D and H, the bearing bushes forming the points of pivotal connection A and B of the lower guide member 15 on the frame-side may be constructed soft whereby the necessary rigidity of the support of the lower guide member in the transverse direction is attainable by offset of the axial direction of the bearing bushes with respect to the axis of rotation 15a.

In the embodiment described by reference to FIGS. 1 to 4, the track rod 17 is located according to the present invention, as viewed in plan view, closer to the wheel plane 21 than the upper guide member 16 which has essentially the same direction of extension as the track rod 17. The point of pivotal connection G of the track rod 17 which is coordinated to the track link steering lever 19 and the wheel carrier 18 is located, again as viewed in plan view, practically above the point of pivotal connection E of the lower guide member 15 on the wheel-carrier side. The point of pivotal connection F of the upper guide member 16 on the wheel-carrier side is located, with respect to the point of pivotal connection G of the track rod 17, at a greater distance to the wheel plane 21. FIG. 5 illustrates a reversal in the location of the upper guide member with the track rod in relation to the wheel plane 21, in addition to other details possible and appropriate in accordance with the present invention; similar parts of the wheel suspension are designated in FIG. 5 by similar, primed reference numerals.

In particular, in FIG. 5, in which an illustration of the floor group has been dispensed with altogether, the lower guide member which extends forwardly in relation to the driving direction is designated by reference numeral 15' and the upper guide member which extends essentially in the opposite direction is designated by reference numeral 16'. The points of pivotal connection E' and F' of the lower guide member 15' and of the upper guide member 16' on the wheel-carrier side are located near the wheel plane 21 and essentially one above the other. The point of pivotal connection G' of the track rod 17' on the wheel-carrier side is offset inwardly by the length of the track link steering lever 19' which is again disposed essentially parallel to the vehicle cross plane 6. The point of pivotal connection H of the track rod 17' on the frame-side is again located in proximity to the axis of rotation 16a' of the upper guide member 16' having points of pivotal connection C' and D' on the frame-side. The points of pivotal connection on the frame-side of the lower guide member 15' which has an axis of rotation 15a', are designated by reference characters A' and B'. Also with this type of arrangement of the track rod 17' in which the points of pivotal connection F' and G' on the wheel-carrier side are located again at approximately the same height and in which additionally also the points of pivotal connection C' and H' on the frame side have the same height location, the point of pivotal connection G' between the track link steering lever 19' and the track rod 17' moves nearly on a circular arc along a spherical surface so that an accurate and exact track steering is possible by way of the track rod 17' and the respectively selected track can be accurately maintained over the entire spring range. In the embodiment according to FIG. 5, as can be seen from the drawing, also the point of pivotal connection E' of the lower guide member 15' on the wheel-carrier side is constituted by a ball joint. As viewed in plan view the points of pivotal connection E', F' and G' on the wheel-carrier side are located essentially in a vehicle cross plane. This cross plane coincides nearly with the vertical vehicle cross plane 6 extending through the wheel center points.

In the embodiment according to FIG. 5, the track rods 17' of the wheels 5 disposed mutually opposite one another in relation to the longitudinal axis 1 of the vehicle, are connected with each other by way of a cross rod 20 on which are disposed the points of pivotal connection H' of the track rods 17' on the frame-side; the track rods 17' are non-rotatably connected with the cross rod 20 in these points of pivotal connection H'. The rod 20, in its turn, is mounted by way of mounting supports 22 within the area of its ends at the floor group of the vehicle which is not illustrated in detail herein. The cross rod 20 which may be constituted by a torsion rod, forms together with the track rods 17' a stabilizer so that the track rods have a double function in this construction. In addition to the point of pivotal connection H', also the point of pivotal connection C' is provided at the rod 20 so that a common support results for the track rod 17' and the outer point of pivotal connection C' of the guide member 16' by way of the mounting supports 22 with respect to the floor group of the vehicle without the need of an additional auxiliary bearer. The mounting supports 22 preferably include elastic inserts.

Furthermore, in the embodiment according to FIG. 5, the lower guide members 15' again constructed as triangular guide members are connected with torsion rods 23 extending in the vehicle longitudinal direction within the area of the point of pivotal connection B' thereof which is displaced furthest inwardly away from the wheel plane 21; the torsion rods 23, in their turn, are mounted at the floor group (not shown) by way of mounting supports 24 and 25. The anchoring of the torsion rods 23 in the mounting supports 25 thereby takes place in a non-rotatable manner whereas it takes place in a rotatable manner in the mounting supports 24. The connection of the guide members 15' constructed as triangular guide members in the points of pivotal connection B' with torsion rods 23 takes place in a non-rotatable manner, for example by serrations or a splined connection by way of corresponding lugs or clamps 26.

In the embodiments according to FIGS. 1 to 5, the track rods 17 and 17' are positionally coordinated to the upper guide members 16 and 16'. However, it is also possible within the scope of the present invention, though not illustrated herein, to positionally coordinate the track rods to the lower guide members whereby the track link steering lever is then located at the height of the point of pivotal connection of the lower guide member on the wheel-carrier side and the direction of extension of the track rod connected with the track link steering lever corresponds to that of the lower guide member. The point of pivotal connection of the track rod on the frame-side is then located in this arrangement within the area of the axis of rotation of the lower guide member.

Differing from the illustrated embodiments according to FIGS. 1 to 5 which represent preferred embodiments, an arrangement of the upper and the lower guide members is also possible within the scope of the present invention in which both guide members are pivotal about axes of rotation disposed in the vehicle longitudinal direction or transversely to the vehicle longitudinal direction. Furthermore, the possibility exists according to the present invention to so arrange the guide members, deviating from the embodiments according to FIGS. 1 to 5, that in relation to the driving direction 4, they extend essentially in the same direction and thus are disposed far-reachingly one above the other.

The arrangement of the guide members illustrated in the embodiments according to FIGS. 1 to 5 which spatially cross each other as regards the location of the axis of rotation thereof is, however, particularly advantageous as regards the attainable driving behavior and consequently, the location of the axes of rotation of the guide members in a wheel suspension according to FIGS. 1 to 4 will be further described hereinafter in detail. The location of the axes of rotation of the guide members in an arrangement according to FIG. 5 corresponds essentially to that according to FIGS. 1 to 4.

Figure 2:
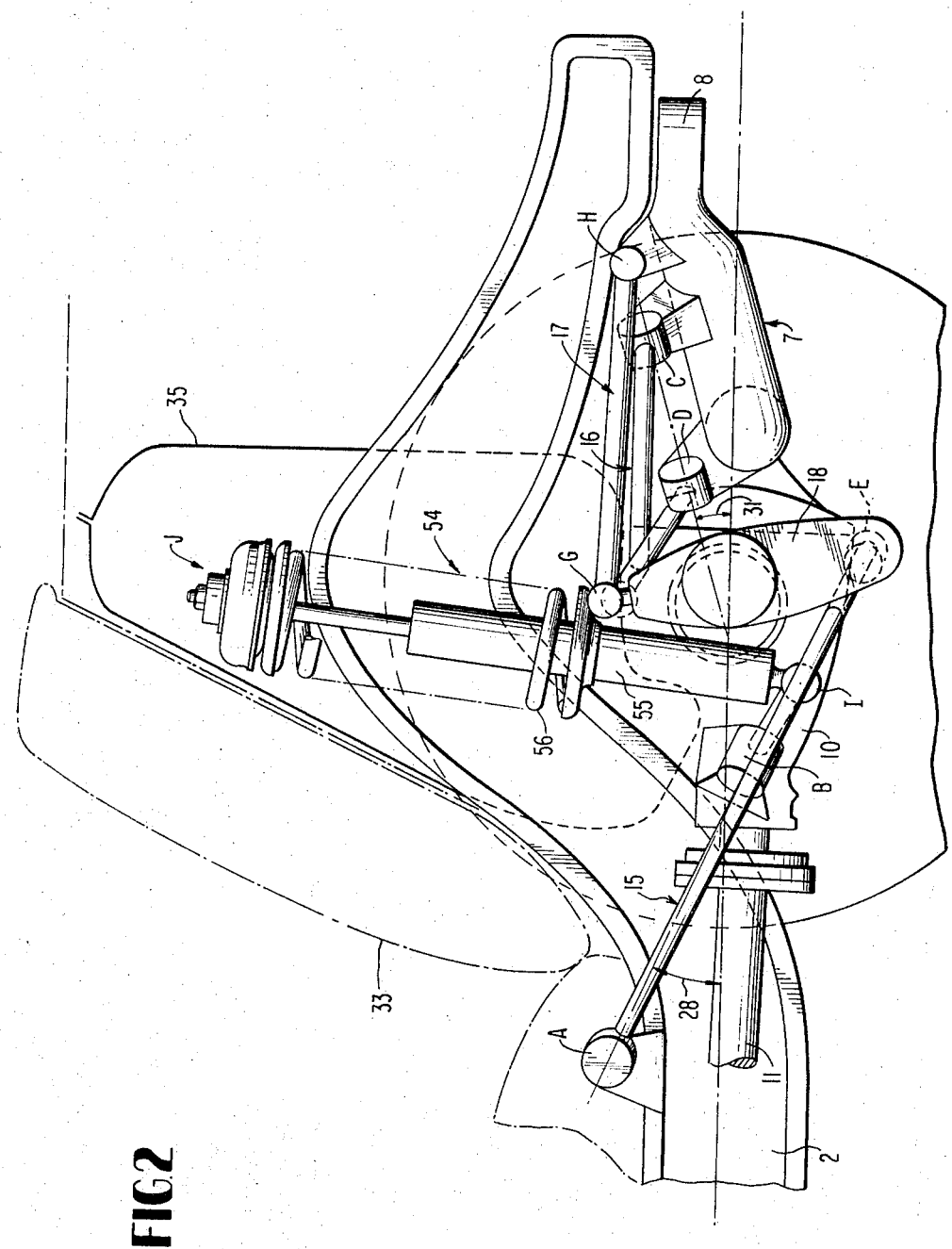
FIG. 2 is a schematic side elevational view of the wheel suspension of FIG. 1, indicating in part also the vehicle body.
Figure 3:
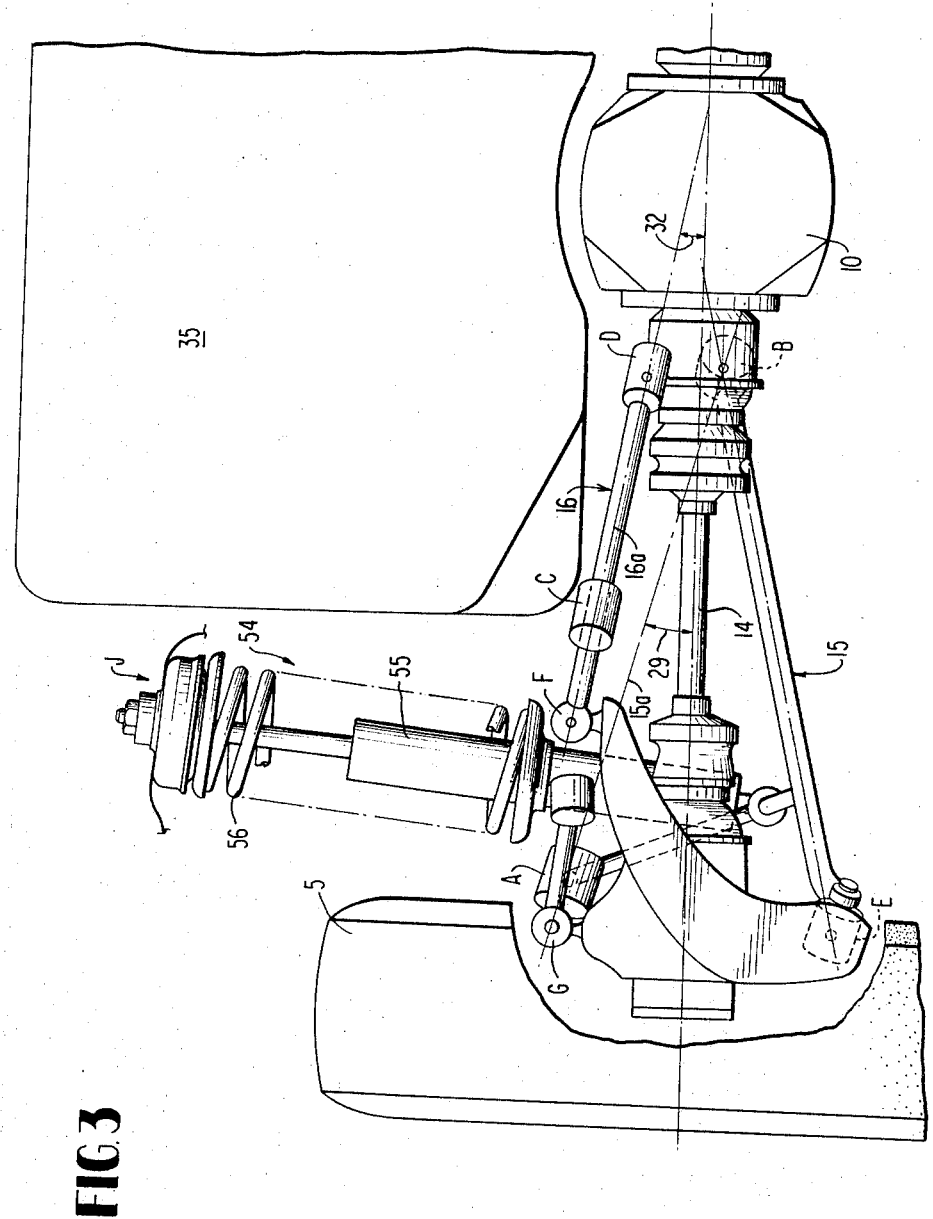
FIG. 3 is a schematic rear elevational view of the wheel suspension of FIGS. 1 and 2, again indicating in part the vehicle body.
Figure 4:
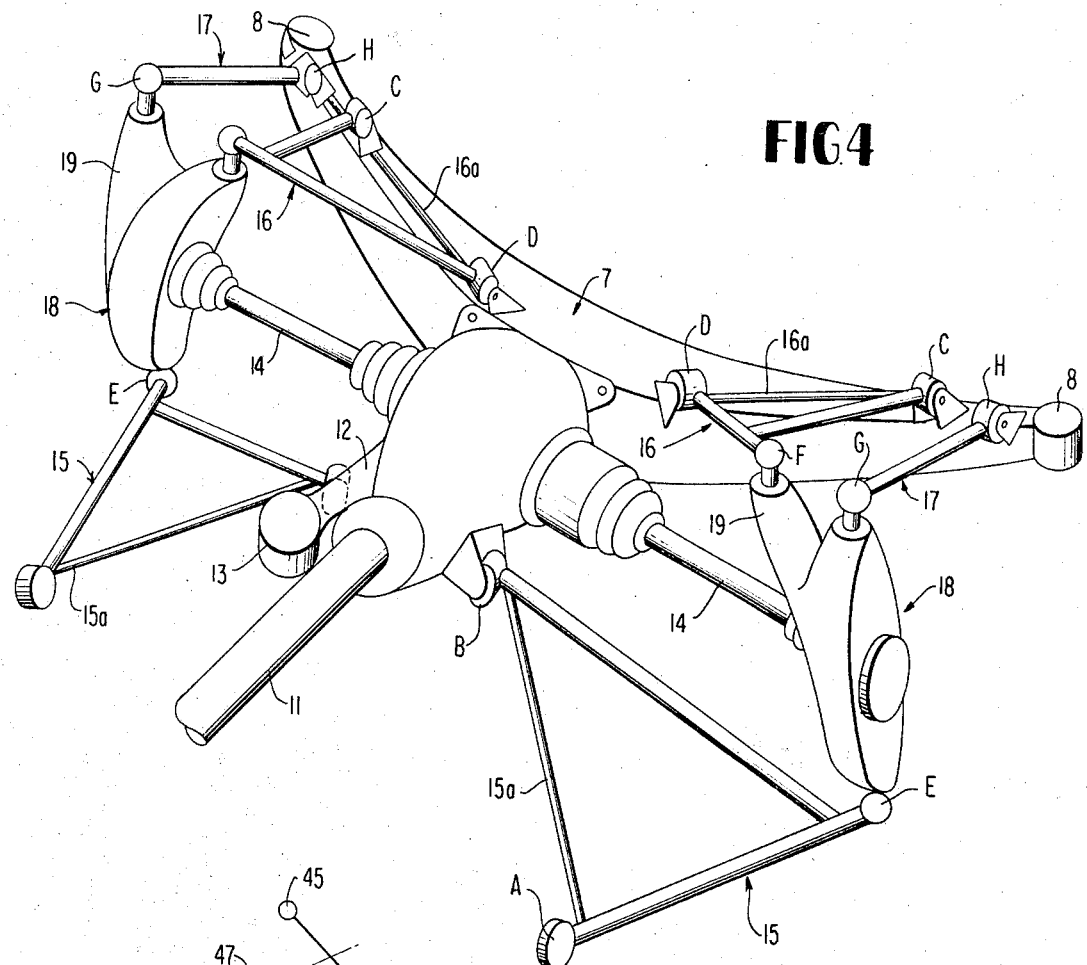
FIG. 4 is a schematic perspective view of a wheel suspension according to the present invention as illustrated in FIGS. 1 to 3.

As illustrated in FIGS. 1 to 3, the axis of rotation 15a of the lower guide member 15, as viewed in plan view, subtends with the longitudinal axis 1 of the vehicle an angle 27 of about 60° which opens in the forward direction. Furthermore, the axis of rotation 15a subtends with respect to a horizontal plane, as viewed in side view (FIG. 2), an angle 28 of about 20°, and as viewed in rear view (FIG. 3), an angle 29 which is also about 20°. In the illustrated embodiment, the exact value for the angle 27 is 60°, for the angle 28 is 23° and for the angle 29 is 17°. The axis of rotation 16a of the upper guide member 16, as viewed in plan view (FIG. 1), subtends with the longitudinal axis 1 of the vehicle an angle 30 of about 60° which opens in the rearward direction. With respect to a horizontal plane, the axis of rotation 16a is inclined at an angle 31 of about 20° as viewed in side view (FIG. 2), and at an angle 32 of about 15° as viewed in rear view (FIG. 3). In the illustrated embodiment the exact value for the angle 30 is 57°, for the angle 31 is 17° and for the angle 32 is 13°.

As can be readily seen from FIGS. 1 to 3, favorable possibilities result from the illustrated arrangement of the guide members for the arrangement of the rear seats 33 (FIG. 2) and of the spare wheel 34 (FIG. 1) which is only schematically indicated and which is accommodated, for example, in a recess or indentation of the floor plate. Furthermore, the tank 35 can be arranged in a favorable manner between the wheels and directly above the axle in the wheel suspension according to the present invention.

Figure 6:
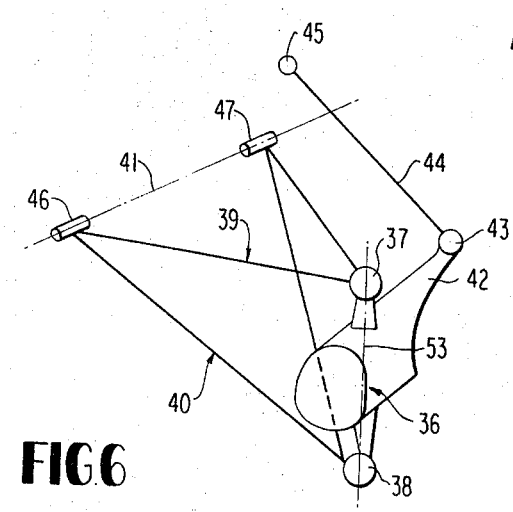
FIG. 6 is a schematic perspective view of a further modified embodiment of an independent wheel suspension according to the present invention.

FIG. 6 is a schematic view of an independent wheel suspension according to the present invention with a wheel carrier 36 which is connected in the points of pivotal connection 37 and 38 which may be constituted by ball joints, with an upper guide member generally designated by reference numeral 39 and with a lower guide member generally designated by reference numeral 40. The upper guide member 39 and the lower guide member 40 are arranged extending in the longitudinal direction of the vehicle (not shown) and have a common axis of rotation 41. A track link steering arm 42 is connected in one piece with the wheel carrier 36 also in this construction; the track link steering lever 42 is connected in a point of pivotal connection 43 at a track rod 44 which has a point of pivotal connection 45 on the frame side. The points of pivotal connection 43 and 45 are constituted by ball joints. The points of pivotal connection 46 and 47 of the guide members 39 and 40 on the frame-side which are located on the common axis of rotation 41, include bearing bushes which are connected with the vehicle frame, i.e., with the floor group of the vehicle by way of guide pins fixed with the frame (not shown). The point of pivotal connection 45 is also located with such a construction according to the present invention within the area of the axis of rotation 41, and more particularly slightly above the same. The points of pivotal connection for 37 and 43 again have essentially the same height location. However, it is also possible within the scope of the present invention to coordinate the track rod 44 to the lower guide member 40 and to provide the point of pivotal connection for the track rod 44 at the track link steering lever with a corresponding arrangement thereof at the height of the point of pivotal connection 38 of the lower guide member 40 of the wheel carrier 36. The point of pivotal connection of the track rod 44 on the frame side is then located approximately opposite the indicated point of pivotal connection 45 in relation to the planes of the guide members 39, 40, and slightly below the axis of rotation 41 in relation to the illustrated embodiment.

Figure 7:
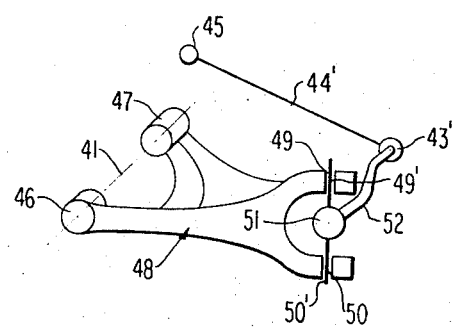
FIG. 7 is a perspective schematic view of still another modified embodiment of a wheel suspension according to the present invention similar to FIG. 6.

A constructively possible and particularly advantageous embodiment of a wheel suspension according to FIG. 6 is illustrated in FIG. 7 whereby the upper and the lower guide members are combined into a single guide member 48 which corresponding to the illustration according to FIG. 6, has points of pivotal connection 46 and 47 on the frame side and an axis of rotation 41. Cylindrical guide means 49 and 50 correspond in the constructive realization according to FIG. 7 to the points of pivotal connection 37 and 38 at the wheel carrier 36; the wheel carrier 51 is retained in the cylindrical guide means 49 and 50 by way of guide pins 49' and 50'. The track link steering lever 52 is mounted at the wheel carrier 51; the point of pivotal connection 43' of the track link steering lever 52 at the track rod 44' which is pivotally connected on the frame side at 45, may be constituted by a ball joint. In lieu of a guidance for the wheel carrier as is illustrated in FIG. 7, it is also possible to utilize an overhung support for the same which is achieved in that the wheel carrier is connected with the guide member exclusively by way of one cylinder bearing support, i.e., by one cylindrical guide means. The direction of extension of the cylindrical guide means for the wheel carrier is always so selected that the axis thereof has at least approximately a location which corresponds to that of the straight line 53 connecting the points of pivotal connection 37 and 38 in FIG. 6.

Whereas in the wheel suspension according to FIG. 5, a torsion rod 23 is provided as spring element which is coordinated to the lower guide member 15', FIGS. 1 to 3 illustrate the support of the lower guide member 15 by way of a respective spring leg 54 which consists of a shock absorber 55 and of a coil spring 56 arranged about the shock absorber 55. The spring leg 54 is mounted at the lower guide member 15 near the wheel carrier 18 in the point of pivotal connection I and extends upwardly from this point of pivotal connection I, and more particularly, slightly inclined inwardly and rearwardly. The support of the spring leg with respect to the floor group is generally designated by reference character J.

The solution according to the present invention resides in that with the location of the point of pivotal connection of the track rod at the track link steering lever at the height of the point of pivotal connection of a guide member having a corresponding direction of extension at the wheel carrier and with a location of the mentioned points of pivotal connection in a common vehicle transverse plane, i.e., in a common plane perpendicular to the vehicle longitudinal direction, a movement curve results for the point of pivotal connection between the track rod and the track link steering lever with an unchanged track of the respective wheel and a movement thereof over the entire spring range, whose points of movement are located nearly in a single plane and described approximately a circular arc in this plane. The center point of this movement curve lies within the area of the axis of rotation of the guide member which extends approximately in the same direction as the track rod. A straight line which extends perpendicularly to the plane defined by the movement curve and which extends through the center point of this movement curve, is located also within the axis of rotation of the guide member extending approximately in the same direction as the track rod and defines according to the present invention the optimum location of the axis of rotation of the track rod in its point of pivotal connection on the frame-side.

If according to the present invention the point of pivotal connection H of the track rod lies on the aforementioned straight line—to be referred to hereinafter as ideal straight line—then an exact track steering results in which practically no track changes, i.e., toe-in or toe-out changes occur during spring movements. Steering effects conditioned by track changes are therefore precluded during spring movements.

With uni-directional and oppositely directed spring movements, however, track changes which have as a consequence steering effects are also precluded if, in relation to the normal base position, the point of pivotal connection of the track rod on the frame side is located according to the present invention in the plane containing the ideal straight line and the point of pivotal connection of the track rod at the track link steering lever because with the location of the point of pivotal connection of the track rod on the frame side within this plane—ideal plane—outside of this ideal straight line, track changes occur but only symmetrical track changes which cause no steering effects. The track changes which result are thereby the smaller the nearer the point of pivotal connection of the track rod on the frame side is located to the ideal straight line so that according to the present invention such a location of the point of pivotal connection on the frame-side represents a location which is particulary advantageous and preferred according to the present invention.

A wheel suspension according to the present invention therebeyond offers also the possibility by a corresponding mutual arrangement of the track rod and of the guide member having the same direction of extension as the track rod with respect to the frame and by a corresponding construction of the points of pivotal connection of the track rod and of this guide member on the frame side which are matched to one another in their hardness, to achieve a lateral force under-control, i.e., to achieve that, in relation to the respective curve-outer wheel, this wheel can pass over into toe-in under the influence of the side forces. In an analogous manner, the respective curve-inner wheel if forced into toe-out by the occurring forces.

In an embodiment of a wheel suspension according to the present invention, in which the point of pivotal connection of the corresponding guide member at the wheel carrier is located farther away from the vehicle longitudinal center plane than the point of pivotal connection of the track rod at the track link steering lever, this can be achieved in that the respective inner point of pivotal connection on the frame-side, i.e., adjacent to the vehicle longitudinal center plane of this guide member, which has approximately the same direction of extension as the track rod, is constituted by a soft bearing place, whereas the respective outer point of pivotal connection on the frame side, i.e., disposed farther away from the vehicle longitudinal center plane, as well as the respective corresponding pivotal connection of the track rod on the frame-side is constituted by a hard bearing place. If now, assuming a corresponding dimension and arrangement of guide members and track rod, the track link steering lever is so guided by way of the guide member and the track rod that by reason of the described construction of the points of pivotal connection, the track link steering lever is displaced under the influence of the side force in the driving direction of the vehicle, as viewed in plan view, in its area near the wheel with respect to its area remote from the wheel, or opposite the driving direction in its area remote from the wheel with respect to its area near the wheel, then one obtains the aimed-at side force under-control.

With a view thereto, it may be additionally appropriate within the scope of the present invention to so select the points of pivotal connection of the upper and lower guide members at the wheel carrier that a straight line passing through these points of pivotal connection, i.e., the pivot axis of the wheel carrier, extends, as viewed in side view, through the floor plane in a point which, in relation to the driving direction, is located to the rear of the point of engagement of the side force so that a moment is produced thereby which forces the respective curve-outer wheel into toe-in and correspondingly the curve-inner wheel into toe-out.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What we claim is:

1. An independent wheel suspension for motor vehicles which includes guide means and wheel carrier means guided as couplers by said guide means, track link steering lever means connected with the wheel carrier means and extending substantially in a vehicle vertical transverse plane, and track rod means pivotally connected with the track link steering lever means in a point of pivotal connection that extends in a plane approximately parallel to the plane of a respective one of said guide means, characterized in that the track rod means with its point of pivotal connection at the track link steering lever means is located at least at approximately the same height as the point of pivotal connection of said one guide means at the wheel carrier means, and in that the track rod means is pivotally connected with its point of pivotal connection opposite the track link steering lever means within the area of the axis of rotation of said one guide means.

2. A wheel suspension according to claim 1, characterized in that said track link steering lever means is fixedly arranged at said wheel carrier means.

3. A wheel suspension according to claim 2, characterized in that said track rod means has approximately the same direction of extension as said one guide means, as viewed in side view.

4. A wheel suspension according to claim 3, characterized in that the wheel suspension includes a rear axle drive.

5. A wheel suspension according to claim 3, characterized in that said guide means include upper and lower guide means.

6. A wheel suspension according to claim 5, characterized in that the track rod means and the upper guide means have approximately the same height location.

7. A wheel suspension according to claim 5, characterized in that the track rod means and the lower guide means have approximately the same height location.

8. A wheel suspension according to claim 5, characterized in that the point of pivotal connection between the track link steering lever means and the track rod means is located, as viewed in plan view, between the wheel plane and the point of pivotal connection of said one guide means at the wheel carrier means.

9. A wheel suspension according to claim 5, characterized in that the point of pivotal connection between the track link steering lever means and the track rod means, as viewed in plane view, is located at a larger distance from the wheel plane than the point of pivotal connection of said one guide means at the wheel carrier means.

10. A wheel suspension according to claim 5, characterized in that at least one of the guide means has an axis of rotation extending in the vehicle longitudinal direction.

11. A wheel suspension according to claim 5, characterized in that at least one of the guide means has an axis of rotation extending substantially transversely to the vehicle longitudinal direction.

12. A wheel suspension according to claim 5, characterized in that at least one of the guide means has an axis of rotation extending obliquely to the vehicle longitudinal direction.

13. A wheel suspension according to claim 10, characterized in that both guide means are constructed as cross guide members.

14. A wheel suspension according to claim 11, characterized in that both guide means are constructed as longitudinal guide members.

15. A wheel suspension according to claim 12, characterized in that both guide means have axes of rotation extending obliquely to the vehicle longitudinal direction.

16. A wheel suspension according to claim 15, characterized in that the axes of rotation extending obliquely to the vehicle longitudinal direction of the guide means as viewed in plan view, are included toward one another, and extend inwardly toward one another.

17. A wheel suspension according to claim 16, characterized in that, as viewed in side view, the axes of rotation of the lower guide means rises forwardly and the axis of rotation of the upper guide means is inclined downwardly.

18. A wheel suspension according to claim 17, characterized in that of the axes of rotation of the guide means which are disposed crossing one another, both the axis of rotation of the upper guide means as also the axis of rotation of the lower guide means extend obliquely downwardly, as viewed in rear view.

19. A wheel suspension according to claim 18, characterized in that the track link steering lever means is made in one piece with the wheel carrier means.

20. A wheel suspension according to claim 19, characterized in that the track rod means extends approximately horizontally.

21. A wheel suspension according to claim 20, characterized in that the upper guide means extends rearwardly in relation to the vehicle longitudinal direction.

22. A wheel suspension according to claim 20, characterized in that the upper guide means extends forwardly in relation to the vehicle longitudinal direction.

23. A wheel suspension according to claim 20, characterized in that the lower guide means extends forwardly in relation to the vehicle longitudinal direction.

24. A wheel suspension according to claim 20, characterized in that the guide means are constructed as triangular guide members.

25. A wheel suspension according to claim 20, characterized in that the points of pivotal connection on the wheel carrier side of the track rod means and of said one guide means as well as the point of pivotal connection on the frame side of the track rod means and the outer point of pivotal connection on the frame side of the upper guide means are constituted by relatively hard bearing places.

26. A wheel suspension according to claim 25, characterized in that the points of pivotal connection on the frame side of the upper guide means and of the track rod means are constituted by bearing places provided at a structural part.

27. A wheel suspension according to claim 26, characterized in that the structural part is an auxiliary bearer means.

28. A wheel suspension according to claim 27, characterized in that the auxiliary bearer means is supported relatively softly in the vehicle longitudinal direction.

29. A wheel suspension according to claim 28, characterized in that the axes of rotation of the upper guide means and of the lower guide means coincide.

30. A wheel suspension according to claim 29, characterized in that the guide means having coinciding axes of rotation are combined into a unitary guide member structure.

31. A wheel suspension according to claim 30, characterized in that the pivotal connection of the combined guide member at the wheel carrier means takes place by way of at least one cylinder bearing means whose axis coincides with a straight line connecting the points of pivotal connection.

32. A wheel suspension according to claim 31, characterized in that the guide means are constructed as triangular guide members.

33. A wheel suspension according to claim 32, characterized in that the track rod means and the upper guide means have approximately the same height location.

34. A wheel suspension according to claim 32, characterized in that the track rod means and the lower guide means have approximately the same height location.

35. A wheel suspension according to claim 32, characterized in that the point of pivotal connection between the track link steering lever means and the track rod means is located, as viewed in plan view, between the wheel plane and the point of pivotal connection of said one guide means at the wheel carrier means.

36. A wheel suspension according to claim 32, characterized in that the point of pivotal connection between the track link steering lever means and the track rod means, as viewed in plane view, is located at a larger distance from the wheel plane than the point of pivotal connection of said one guide means at the wheel carrier means.

37. A wheel suspension according to claim 1, characterized in that at least one of the guide means has an axis of rotation extending in the vehicle longitudinal direction.

38. A wheel suspension according to claim 37, characterized in that both guide means are constructed as cross guide members.

39. A wheel suspension according to claim 1, characterized in that at least one of the guide means has an axis of rotation extending substantially transversely to the vehicle longitudinal direction.

40. A wheel suspension according to claim 39, characterized in that both guide means are constructed as longitudinal guide members.

41. A wheel suspension according to claim 1, characterized in that at least one of the guide means has an axis of rotation extending obliquely to the vehicle longitudinal direction.

42. A wheel suspension according to claim 41, characterized in that both guide means have axes of rotation extending obliquely to the vehicle longitudinal direction.

43. A wheel suspension according to claim 42, characterized in that the axes of rotation extending obliquely to the vehicle longitudinal direction of the guide means as viewed in plan view, are inclined toward one another, and extend inwardly toward one another.

44. A wheel suspension according to claim 42, characterized in that, as viewed in side view, the axes of rotation of the lower guide means rises forwardly and the axis of rotation of the upper guide means is inclined downwardly.

45. A wheel suspension according to claim 42, characterized in that of the axes of rotation of the guide means which are disposed crossing one another, both the axis of rotation of the upper guide means as also the axis of rotation of the lower guide means extend obliquely downwardly as viewed in rear view.

46. A wheel suspension according to claim 1, characterized in that the track link steering lever means is made in one piece with the wheel carrier means.

47. A wheel suspension according to claim 1, characterized in that the track rod means extends approximately horizontally.

48. A wheel suspension according to claim 5, characterized in that the upper guide means extends rearwardly in relation to the vehicle longitudinal direction.

49. A wheel suspension according to claim 5, characterized in that the upper guide means extends forwardly in relation to the vehicle longitudinal direction.

50. A wheel suspension according to claim 5, characterized in that the lower guide means extends forwardly in relation to the vehicle longitudinal direction.

51. A wheel suspension according to claim 50, characterized in that the upper guide means extends rearwardly in relation to the vehicle longitudinal direction.

52. A wheel suspension according to claim 50, characterized in that the upper guide means extends forwardly in relation to the vehicle longitudinal direction.

53. A wheel suspension according to claim 5, characterized in that the guide means are constructed as triangular guide members.

54. A wheel suspension according to claim 5, characterized in that the points of pivotal connection on the wheel carrier side of the track rod means and of said one guide means as well as the point of pivotal connection on the frame side of the track rod means and the outer point of pivotal connection on the frame side of the upper guide means are constituted by relatively hard bearing places.

55. A wheel suspension according to claim 5, characterized in that the points of pivotal connection on the frame side of the upper guide means and of the track rod means are constituted by bearing places provided at a structural part.

56. A wheel suspension according to claim 55, characterized in that the structural part is an auxiliary bearer means.

57. A wheel suspension according to claim 56, characterized in that the auxiliary bearer means is supported relatively softly in the vehicle longitudinal direction.

58. A wheel suspension according to claim 5, characterized in that the axes of rotation of the upper guide means and of the lower guide means coincide.

59. A wheel suspension according to claim 58, characterized in that the guide means having coinciding axes of rotation are combined into a unitary guide member structure.

60. A wheel suspension according to claim 59, characterized in that the pivotal connection of the combined guide member at the wheel carrier means takes place by way of at least one cylinder bearing means whose axis coincides with a straight line connecting the points of pivotal connection.

* * * * *